United States Patent Office 3,456,043
Patented July 15, 1969

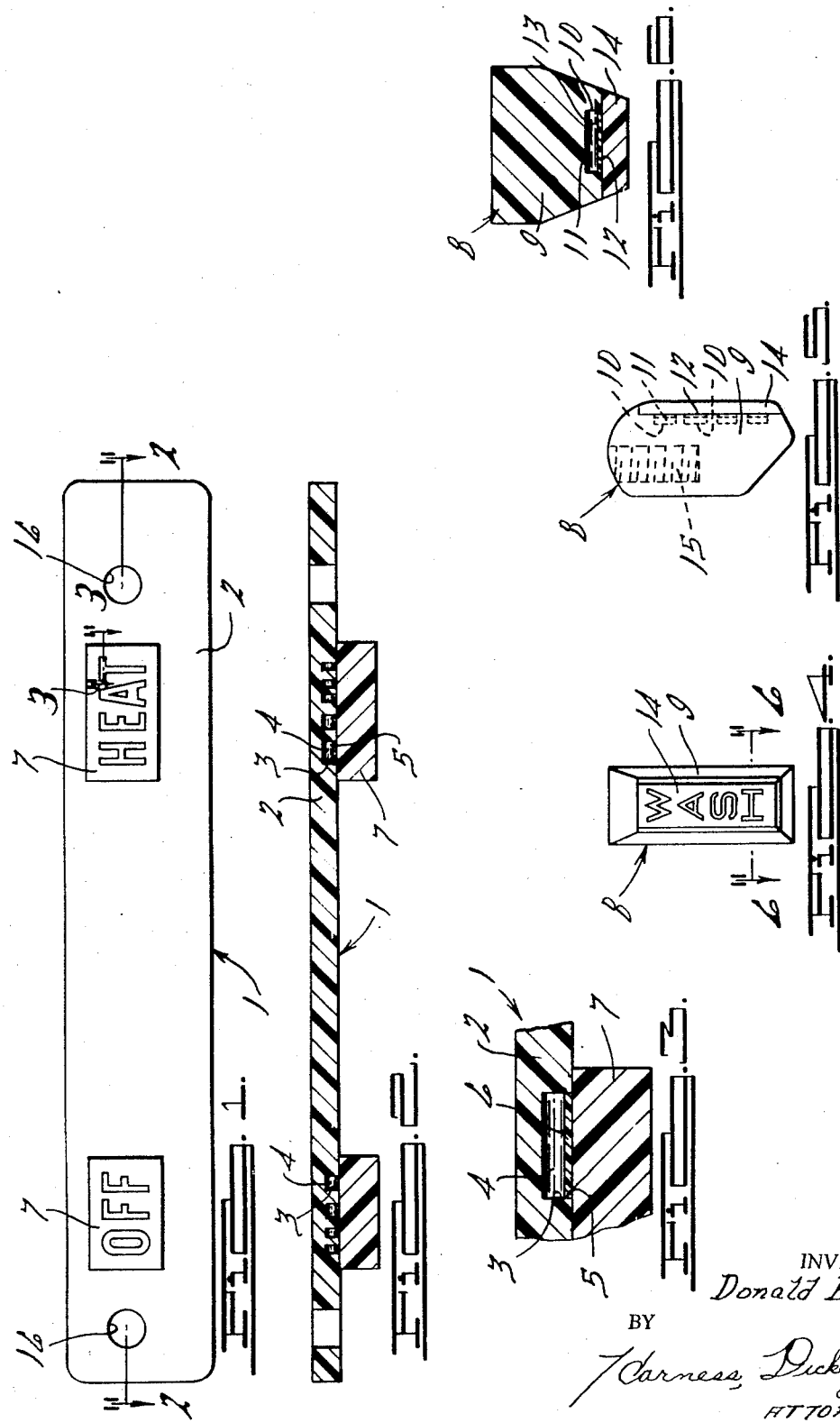

3,456,043
METHOD FOR MAKING LUMINOUS PLASTIC ARTICLES
Donald B. Emery, Grosse Pointe Park, Mich., assignor to Sheller Manufacturing Corporation, Detroit, Mich., a corporation of Indiana
Filed Oct. 1, 1965, Ser. No. 492,205
Int. Cl. B32b 1/10, 1/06; C09k 1/00
U.S. Cl. 264—21                    1 Claim

ABSTRACT OF THE DISCLOSURE

A method of preparing a luminous article comprising the steps of: (a) injection molding a first plastic part so that it contains at least one cavity portion, (b) placing a luminous material within each of said cavity portions to form luminous material containing cavities, (c) sealing each cavity with a sealant material to thereby enclose the luminous material within said cavities in the first plastic part, and (d) injection molding a second plastic part over the first plastic part.

---

This invention relates to certain new luminous molded plastic articles and the method of their preparation.

In the past, plastic parts such as knobs, dials, instrument plates, etc., on the dashboards of automobiles and other instrument panels, when used in any kind of an environment which would require that the knobs and dials be in easy view under all conditions, have required that lighting be available. Provision of electric wiring and the light bulbs necessary to light up this type of environment, of course, is space consuming, expensive and difficult to install.

It is therefore an object of the present invention to provide novel plastic articles which contain a luminous material which has been molded into the interior of the article by way of a certain multi-step processing. This eliminates the need for electric wiring, bulbs or other indirect lighting mechanisms which are now used in a majority of applications.

It is a further object of the invention to provide a novel molding method to prepare the luminous plastic article.

Still further, it is an object of the invention to provide a new molding process for producing these luminous plastice articles, which articles are for use on automobile dashboards and other instrument panels.

Other objects and advantages of the invention will become apparent to those skilled in the art upon a reading of the following description.

Broadly stated, the articles of the present invention, which may have any desired exterior configuration, are prepared by suitably molding a plastic material such that it contains one or more small openings or holes communicating with hollow interior portions or cavities within the molded plastic material. A luminous material is positioned in each cavity of the plastic part and sealed in place with a sealant material. This first plastic part containing the selected luminous material sealed into position is then subjected to a second molding step in which a second plastic material to act as an envelope, sheath or cover is molded over the first plastic part to form the desired article. The result through proper design and choice of materials is a plastic article which is luminous at all times and hence easily visible under poorly lighted conditions.

The method embodiment of the invention broadly stated comprises the steps of molding a first plastic part so that it contains a cavity or cavities, placing a luminous material within said cavity, then sealing each cavity with a sealant material to enclose the luminous material, and then molding a second plastic part over the first plastic part to form the desired finished article.

The invention will be more completely understood when the following description is considered in connection with the accompanying drawings, in which:

FIGURE 1 is a front view of a luminous molded plastice article in accordance with the invention;
FIGURE 2 is a cross-sectional view taken along the line 2—2 of FIGURE 1;
FIGURE 3 is a cross-sectional view taken along the line 3—3 of FIGURE 1;
FIGURE 4 is a front view of another embodiment of the invention;
FIGURE 5 is a side view of FIGURE 4; and
FIGURE 6 is an exploded cross-sectional view of FIGURE 5 taken along the line 6—6 in FIGURE 4 thereof.

Referring now to the drawings, FIGURES 1, 2 and 3, wherein like numerals refer to like elements, show a flat elongated plate which is useful as a dashboard heater-control assembly generally indicated as 1. The instrument plate is shown with small holes 16 at each end so that the plate can be readily affixed to the dashboard of an automobile. The plastic part 2 which, in the embodiment shown, serves as a background for the instrument plate 1 contains several hollow portions or cavities 3 within each of which is contained a luminous material 4 as illustrated in FIGURES 2 and 3. As shown, the several cavity portions 3 within the plastic part 2, have been molded in such a fashion as to form lettering on the instrument plate. The plastic part 2 containing the hollow portions or cavities 3 is shown as having second plastic parts 7 molded over it to give the desired shape of the finished article. As shown, both the plastic part 2 and the second plastic part 7 would be made of transparent materials, however, it should be understood that either the plastic part 2 or the plastic part 7 molded over it could also be transluscent or opaque. For example, the plastic part 2 could be opaque in order to provide a background for the luminous material 4 which forms the lettering on the instrument plate.

As an example illustrating when the plastic part 7 would be opaque, a design might be required where the lettering would be readable from the backside of the instrument plate shown in FIGURE 1. In a design of this type, the plastic part 7 would be opaque to provide a background for the lettering, and the hollow plastic part 2 containing the luminous material filled cavities 3 would be transparent. The lettering would of course be reversed, so that it is readable from the backside of the instrument plate as now shown.

An exploded view illustrating the luminous material 4 sealed in place within the opening 5 of the cavity 3 is shown in FIGURE 3, which is taken along the lines 3—3 of FIGURE 1 or FIGURE 2. The sealant material 6 is illustrated placed over the top of the luminous material 4 which is inserted in position within the plastic part 2. The plastic part 7 is then illustrated molded over the plastic part 2 which contains the enclosed luminous material sealed in place. The particular embodiment of the invention shown in FIGURES 1, 2 and 3 illustrates an automobile dashboard heater-control assembly. The luminous material enclosed in the letter-shaped cavities makes the assembly readily visible and readable while obviating the cumbersome requirement of electric wiring and bulbs behind the dashboard.

A further embodiment of the invention constituting a windshield washer control knob generally indicated as 8 is illustrated in FIGURES 4, 5 and 6. The knob is used on automobile dashboards to function as a windshield wiper, washer control. In FIGURES 4 to 6, wherein like numerals indicate like elements, a first plastic part 9 is shown with several cavities indicated as 10, each containing a luminous material 11 held in place within openings 12 by sealant material 13 which closes, sheaths or covers the openings to the cavities 10. An illustration of the cavity 10 within the plastic part 9 is shown in exploded form in FIGURE 6, which is a cutaway view through lines 6—6 of FIGURE 4. The plastic part 9, with the enclosed luminous material 11 held in place by the sealant material 13, is shown molded over by the second plastic part 14 to give the finished article. The windshield washer knob 8 is also shown containing a threaded hole 15 in FIGURE 5 enabling easy mounting of the knob on an automobile dashboard. In accordance with the invention, a knob of this type is readily visible on a dashboard under all conditions.

The method of making the luminous plastic articles of the invention can best be understood as follows: A first plastic part is formed by molding such that it is hollow and contains several hollow portions or cavities. By the term molding, it is meant to include only the techniques of compression molding or injection molding, both of which are suitable for performing the method of the present invention.

The plastic part which is to contain the sealed in, encapsulated or enclosed luminous material within the cavity or cavities must be designed so that it can be used in a second molding step. As to the cavities, or hollow portions, they may be in any desired shape dependent upon the use of the finished product such as, for example, the cavities may be shaped to form the luminous letters on an instrument panel plate as shown in FIGURE 1. The plastic part 2 is not limited to having only small cavity portions 3 as shown in the figure, rather these cavities may be of any desired shape or size and may be present in the plastic part in any desired number. The design of the hollow plastic part must also take into account the amount of luminescence required, the shape of the part, the end use of the part and its expected length of use in terms of time. Plastic material used for the first plastic part may be any transparent, translucent and/or opaque material dictated by the design of the part and the particular application for which the part is to be used.

A number of materials may be selected for this first plastic part and also for the plastic part which is to be molded over it. The material selected is normally of the thermoplastic type, although thermosetting materials could also be used. For example, the following materials would be suitable plastics: the cellulosics, the polycarbonates, the acrylics, the styrenes, the vinyls and the polyamides. Any of these or mixtures thereof could be used dependent upon the particular engineering properties desired. Best results have been achieved with the acrylic plastics, and therefore the acrylics are the preferred material. The first plastic part would normally be transparent but could, depending upon the design, be translucent or opaque as well. For example, it may be opaque if it were to be used as the background piece in a luminous plastic article which contained lettering therein.

After molding of the first plastic part, and again by the term molding in the present invention it is meant either compression molding or injection molding, the luminous material is applied and sealed into place with a suitable sealant material. The luminous material may be applied to the hollow portions or cavities in a number of various manners such as, for example, by means of a hypodermic, brush, spatula or the like. The sealant material must be compatible with the material of which the first plastic part is made. By the term compatible with respect to the sealant, it is meant that the sealant material will not adversely affect the first plastic part, that the sealant material will not break down during the second molding step in which the plastic is molded over the first plastic part, and that it will not adversely affect the second plastic part when it is molded over the composite first plastic part. The sealant may be chosen from a number of suitable materials such as, for example, the resin adhesives of the epoxy type or the silicone type; also, the sealant may be a monomer of the same plastic material from which the first plastic part is made or it may be a plastisol of the same, or other compatible plastic in a suitable solvent for the selected plastic material. The sealant material may be applied to the hollow portion or cavity in a number of manners, for example, by means of hypodermic, spatula, brush or the like.

With regard to the luminous material the choice thereof is not critical, and it can be selected from a number of suitable materials. By the term luminous material herein, it is meant to include those materials which are self-luminescent because the material does not require excitation or activation from exterior sources, or because the material contains its own source of excitation, such as a radioactive isotope, within its composition. Suitable luminous materials for the present invention would be the luminous phophor mixtures of the type such as, for example, zinc sulfide:zinc oxide-zinc, and calcium tungstate-tungsten. A particularly suitable luminous material for use in the invention is a phosphor-radioactive isotope mixture in which the isotope is promethium-147, and best results have been obtained with this material. A comprehensive description of luminous materials comprising phosphor mixtures can be found in Lange's Handbook of Chemistry, 9th edition, pp. 1407–1409.

After the luminous material is sealed in place, the sealant is allowed to set up, cure, polymerize, dry, etc., depending on its nature. The first plastic part is then ready to have a second plastic part molded over it. To perform this the composite first plastic part is positioned as an insert into a second mold, and a second plastic part is molded over the first part, either by compression molding or injection molding. As the second plastic is molded over the first plastic part, the first plastic part is heated to such an extent by the second molding step as to allow the second plastic to fuse or unite with the first plastic part. The heat and pressure of molding the second plastic part bonds the second plastic part firmly to the first plastic part without destroying, distorting or damaging the luminous material or its sealant. This bonding of the second plastic part around the first plastic part can be readily effected without releasing the luminous material. The second plastic part must be compatible with the first plastic part, and by compatible with respect to this second plastic part, it is meant that the second plastic will not adversely affect the first plastic part or sealant material during the second molding step, and that it will ineffect fuse with the first plastic part and form in conjunction with the first plastic part a complete plastic part which envelopes, encloses or covers the encapsulated luminous material. For example, the second plastic part may be comprised of any of the materials, or mixtures thereof, above mentioned for the first plastic part in a transparent, translucent or opaque color, depending upon the particular design for which the finished article is to be used.

After the second plastic is molded over the first plastic part, the completed composite part is removed from the mold, and it may be finished or trimmed, if required. The finished part may then be used in a variety of applications suitable for the particular plastic selected, and where luminous properties are desired. Plastic articles made by the process of the invention are particularly useful as knobs, dials, plates, etc., for automobile dashboards, instrument panels in airplanes or manned spacecraft, telephones, light switches, radios, television sets and the like. Plastic articles of the invention would also be useful in many other applications requiring articles which can be seen in the dark, or other environmental conditions where easy visibility is required.

The foregoing descriptions of the invention and of the specific embodiments of the invention have been given merely by way of example, and it is to be understood that no limitations are intended thereby except as defined by the appended claim.

What is claimed is:
1. The method of preparing a luminous article comprising the steps of:
   (a) injection molding a first plastic part so that it contains at least one cavity portion, with material for said first part being selected from the group of plastics consisting of the cellulosics, the polycarbonates, the acrylics, the styrenes, the vinyls, the polyamides, and mixtures thereof,
   (b) placing a luminous material within each of said cavity portions to form luminous material containing cavities, wherein said luminous material is a phosphor-radioactive isotope mixture,
   (c) sealing each cavity with a sealant material to thereby enclose the luminous material within the cavities in the first plastic part, wherein said sealant material is selected from the group consisting of an epoxy resin adhesive, a silicone resin adhesive, a monomer of a plastic from the above group of plastics, and a plastisol of a plastic form the above group of plastics, and
   (d) injection molding a second plastic part over the first plastic part with material for said second part being selected from the above group of plastics.

References Cited
UNITED STATES PATENTS

| | | | |
|---|---|---|---|
| 2,330,718 | 9/1943 | Kallman | 161—5 |
| 2,577,030 | 12/1951 | Newmann | 161—5 |
| 2,584,841 | 2/1952 | Caprez et al. | 161—5 |
| 3,086,250 | 3/1963 | Gits | 264—250 |

JACOB H. STEINBERG, Primary Examiner

U.S. Cl. X.R.

161—5, 6; 264—255